US005234532A

United States Patent [19]

Tomikura et al.

[11] Patent Number: 5,234,532

[45] Date of Patent: Aug. 10, 1993

[54] APPARATUS FOR CONNECTING PAPER WEB WITH A PAPER WEB THREADING MEMBER

[75] Inventors: Keiki Tomikura; Kazuaki Shibuya, both of Tokyo, Japan

[73] Assignee: Kabushiki Kaisha Tokyo Kikai Seisakusho, Japan

[21] Appl. No.: 871,684

[22] Filed: Apr. 21, 1992

[30] Foreign Application Priority Data

Apr. 30, 1991 [JP] Japan ................................ 3-124572

[51] Int. Cl.[5] ............................................ B32B 31/00

[52] U.S. Cl. .................................. 156/389; 156/468; 156/486; 156/538; 206/411; 226/91; 226/92

[58] Field of Search .................... 226/91, 92; 156/281, 156/389, 468, 486, 538, 543, 523, 527, 577, 574, 579; 206/411; 225/39, 46; 83/649

[56] References Cited

U.S. PATENT DOCUMENTS

| | | | |
|---|---|---|---|
| 2,400,435 | 5/1946 | Nelson et al. | 156/527 |
| 3,895,059 | 7/1975 | Link | 156/579 |
| 4,668,326 | 5/1987 | Mistyurik | 156/384 |
| 4,685,392 | 8/1987 | Watanabe | 101/226 |
| 4,812,198 | 3/1989 | Fuke et al. | 156/497 |
| 5,171,397 | 12/1992 | Arnold | 156/523 |

FOREIGN PATENT DOCUMENTS 229727 2/1990 Japan .

*Primary Examiner*—Michael W. Ball
*Assistant Examiner*—Paul M. Rivard
*Attorney, Agent, or Firm*—Ronald P. Kananen

[57] ABSTRACT

This invention has for its object to provide an apparatus for connecting a paper web with a paper web threading member wherein during the stand-by period of a retaining device the adhesive surface of an adhesive material in the retaining device is covered up by a movable cover so that paper dust or the like may be prevented from depositing thereon. The apparatus comprises a paper web retaining member connected to the upstream end of the paper web threading member and adapted to be located at a predetermined position along a paper web threading path where it is allowed to stand by; a retaining device for retaining a paper web, which has been advanced to the predetermined position along the path, onto the paper web retaining member through the intermediary of an adhesive material; and a movable cover provided in juxtaposition with the retaining device and adapted to be moved so as to selectively cover up or expose at least the adhesive surface of the adhesive material.

4 Claims, 4 Drawing Sheets

APPARATUS FOR CONNECTING PAPER WEB WITH A PAPER WEB THREADING MEMBER

BACKGROUND OF THE INVENTION

1. Field of the Invention

This invention relates to an apparatus for connecting a paper web with a paper web threading member, which is adapted for use in an automatic paper web threading device of a paper web processing or handling machine, such as for example, a rotary printing press for printing a newspaper or the like.

2. Description of the Prior Art

As an apparatus for connecting a paper web with a paper web threading member, of the kind specified above, the arrangement described, for example, in the publication NO. HEI 2-29727 of Japanese Laid-open Utility Model Registration Application is heretofore known. According to this prior art apparatus, in an automatic paper web threading device for drawing out a paper web from a paper web take-up reel installed at a paper supply station and automatically threading the paper web through a paper web threading member along a predetermined paper web threading path, the paper web is divided by the action of a slitter, which is disposed at a predetermined position along the paper web threading path, into two portions, that is, two divided paper webs are formed, and one of the divided paper webs is connected to another paper web threading member, which is run along another paper web threading path.

This prior art apparatus is arranged such that one of the divided papers formed by division of the paper web by the slitter and a paper web retaining member connected to the upstream end of a paper web threading rope (which is a paper web threading member) are caused to overlap each other between an adhesive tape applying roller, around which an adhesive tape is partially wound, and a holding roller, and then the adhesive tape applying roller is moved down and the holding roller is moved up at the same time so as to hold or press the divided paper web and the paper web retaining member therebetween, thereby connecting them through the intermediary of the adhesive tape.

The above-mentioned prior art apparatus has suffered from the following problem.

That is to say, since an adhesive tape is always drawn out from a tape reel (an adhesive material take-up reel) mounted on an apparatus for connecting a paper web with a paper web threading member to an adhesive tape applying roller, and the adhesive surface of the tape is exposed, dust scattered from the surrounding parts and paper dust generated when the advancing paper web is cut will deposit on the adhesive surface, thereby lowering the adhesive power of the tape, which resulted in a poor connection of the paper web with the paper web threading member. Therefore, it has been desired to constitute the apparatus for connecting a paper web with a paper web threading member in a dust-proof construction.

SUMMARY OF THE INVENTION

The present invention has been made in view of the above-mentioned circumstances in the prior art, and has for its object to provide an apparatus for connecting a paper web with a paper web threading member, which does not allow dust scattered in the air or airborne dust or paper dust generated by slitting paper web by a slitter to deposit on the adhesive surface of an adhesive tape, and which enables the adhesive tape to keep a sufficient adhesive power and also an improvement in the operational efficiency to be achieved.

To achieve the above-mentioned object, according to a main aspect of the present invention, there is provided an apparatus for connecting a paper web with a paper web threading member, which is adapted for use in a paper web handling machine comprising an automatic paper web threading device for threading a paper web along a predetermined paper web threading path from the upstream side thereof towards the downstream side thereof, the apparatus comprising: a paper web retaining member connected to the upstream end of the paper web threading member and adapted to be located at a predetermined position along the paper web threading path where it is allowed to stand by; a retaining means for retaining a paper web, which has been advanced to the predetermined position along the paper web threading path, onto the paper web retaining member through the intermediary of an adhesive material; and a movable cover means provided in juxtaposition with the retaining means and adapted to be moved so as to selectively cover up or expose at least the adhesive surface of the adhesive material.

When the retaining means stands by, at least the adhesive surface of the adhesive material in the above-mentioned retaining means is covered up by the movable cover means so that paper dust or the like may be prevented from depositing thereon.

If it is desired to operate the retaining means to retain a paper web, which has been advanced to a position where the paper web threading member stands by, onto the paper web threading member, before commencement of operation of the retaining means, the movable cover means is rendered operative to expose the adhesive surface of the adhesive material covered up thereby.

Upon completion of the operation of the retaining means, the movable cover means is actuated so as to return again to the above-mentioned covered-up condition during the stand-by period.

DETAILED DESCRIPTION OF THE PREFERRED EMBODIMENT

One embodiment of the present invention for use in a rotary printing press for printing a newspaper or the like will be described with reference to the accompanying drawings.

Figure 1:
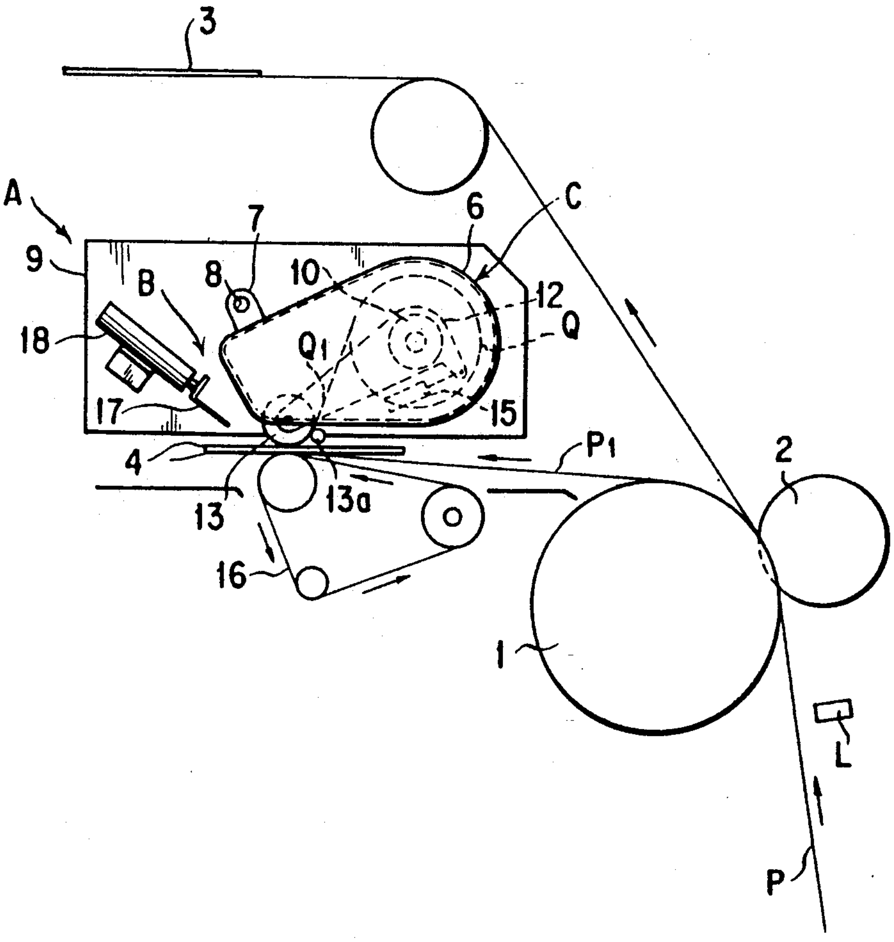
FIG. 1 is a front view showing the schematic construction of an apparatus for connecting a paper web with a paper web threading member, which is in operating condition to connect the paper web with the paper web threading member through the intermediary of an adhesive tape.
Figure 2:
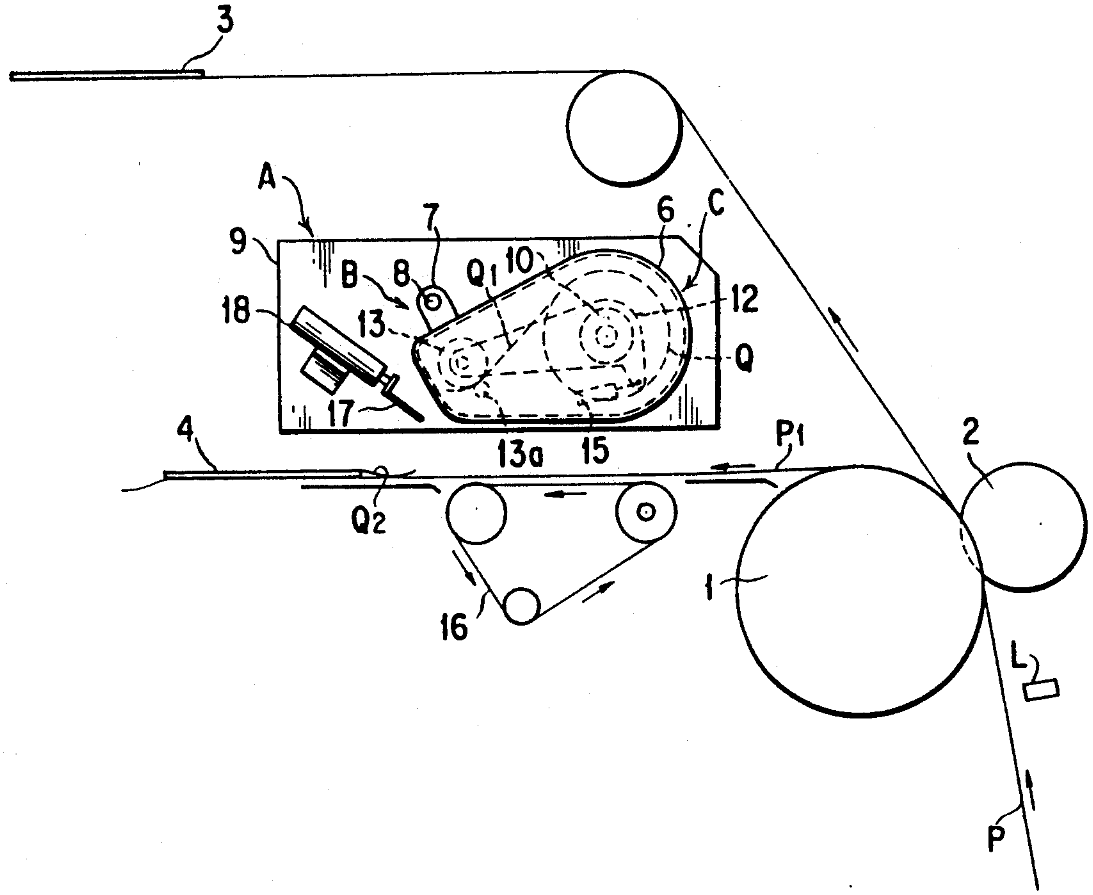
FIG. 2 is a front view showing a condition of the apparatus which has completed the operation of connecting the paper web with the paper web threading member.
Figure 3:
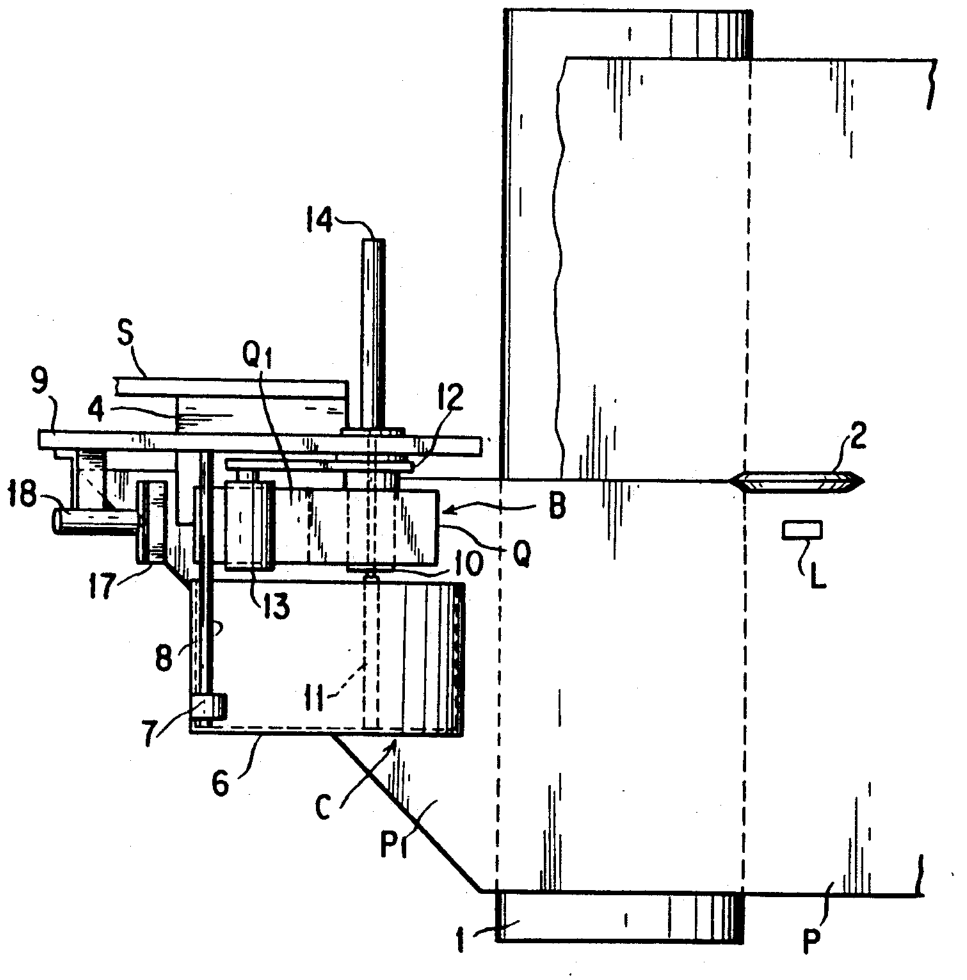
FIG. 3 is a top plan view of the apparatus shown in FIG. 1.
Figure 4:
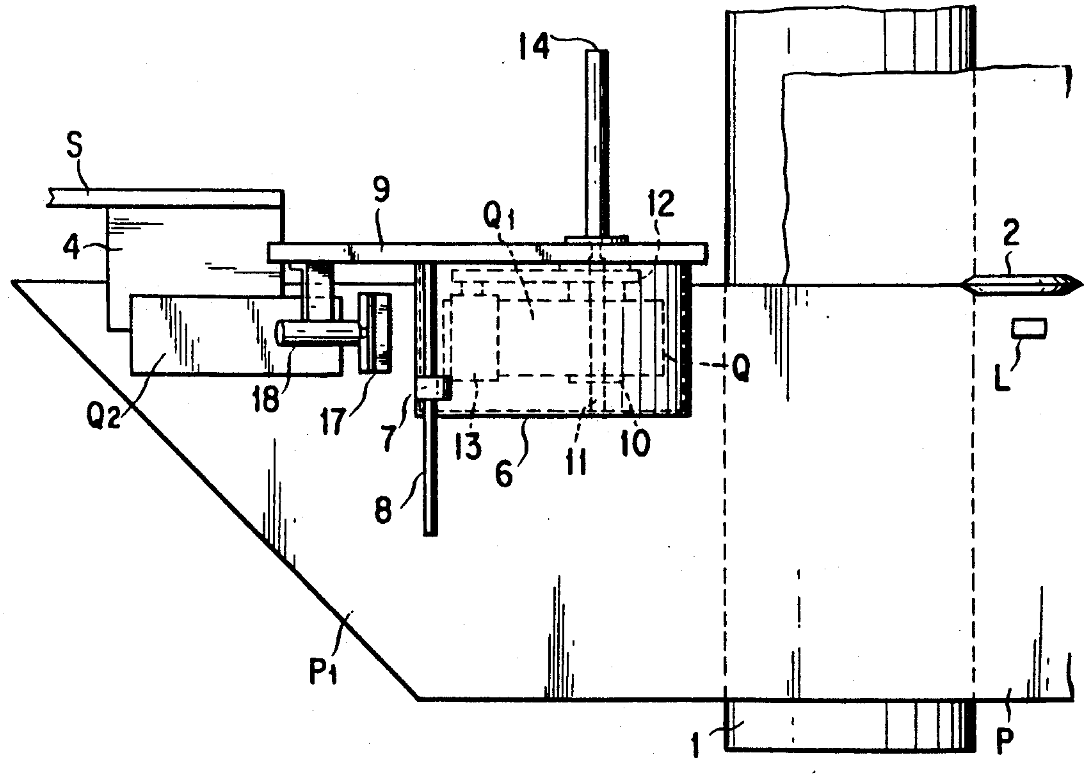
FIG. 4 is a top plan view of the apparatus shown in FIG. 2.

FIG. 1 and 2 are front views showing the schematic construction of an apparatus for connecting a paper web with a paper web threading member according to the present invention, and FIGS. 3 and 4 are top plan views of the apparatus shown in FIGS. 1 and 2.

Located along a paper web threading path of a rotary printing press for printing newspaper or the like is a paper web retaining member 3 connected to a paper web threading member (not shown) of an automatic paper web threading apparatus, which is adapted to retain the leading end of a paper web P drawn out from a paper web take-up reel (not shown) installed at a paper web supply station for conducting a paper web threading operation.

A drag roller 1 located along the paper web threading path has a groove (not shown) which is formed on the outer peripheral surface of the axially central portion thereof, and with which a slitter 2 is engaged. A sensor L for detecting the paper web P is provided on the upstream side of the drag roller 1. In the vicinity of the downstream side of the slitter 2, an apparatus A for connecting a paper web with a paper threading member is mounted, and a paper web retaining member 4 of a paper web threading member S stands by.

The apparatus A for connecting a paper web with a paper web threading member is constituted by a retaining means B for retaining a paper web (a divided paper web P1 which is mentioned later, in this embodiment) onto the paper web retaining member 4, and a movable cover means C provided in juxtaposition with the retaining means B. Stated more specifically, an upstanding plate 9 fixedly secured to a frame of a paper web handling machine (not shown) is provided, and a sleeve 10 is fixedly secured to the front surface of the plate 9. A base end portion of an arm 12 supporting a holding roller 13 in a freely rotatable fashion is fitted from the outside over the sleeve 10. The arm 12 is prevented by a stopper member (not shown) from moving axially relative to the sleeve 10, and is supported on the sleeve 10 so that it can be turned freely.

Further, provided on the front surface of the plate 9 is a pneumatic or hydraulic cylinder 15 having a movable rod whose leading end is connected to the arm 12. A take-up reel Q having an adhesive tape $Q_1$ wound thereon is mounted on the peripheral surface of the sleeve 10, and the adhesive tape Q1 is drawn out, with the leading end portion thereof being extended along the lower peripheral surface of the holding roller 13 and held between the roller 13 and a small roller 13*a* located opposite thereto by a clamping force exerted therebetween.

Further, the plate 9 has a guide 8 fixedly secured to the front surface thereof and which has a block 7 slidably fitted thereon. The block 7 is fixedly secured to a cover 6. A pneumatic or hydraulic cylinder 18 provided with a cutter 17 is fixedly secured through a bracket to the front surface of the plate 9.

Still further, a conveyor 16 adapted to be moved up and down by an elevator means, not shown, is provided at a position opposite to the holding roller 13 relative to the position where the paper web retaining member 4 stands by, and constitutes the paper web retaining means B together with the aforementioned component parts.

Whilst as best seen in FIG. 3, fixedly secured to the rear surface of the plate 9 at right angles thereto is a pneumatic or hydraulic cylinder 14 having a movable rod, which passes through the holes formed in the plate 9 and the sleeve 10, and is projected at right angles to the front surface of the plate 9, and whose leading end is connected to an extension rod 11, the leading end of which supports the cover 6, thus forming the movable cover means C.

The operation of the present invention will now be described in detail hereinbelow.

In FIG. 1, when the paper web P retained by the paper web retaining member 3 and guided along a predetermined paper web threading path is detected by the sensor L, the movable rod of the pneumatic or hydraulic cylinder 14 (shown in FIG. 3) is extended by a command from the sensor L to move the cover 6, thereby exposing the adhesive tape Q1, the adhesive tape take-up reel Q, the holding roller 13 and the arm 12, and so forth of the retaining means B which are covered up by the cover 6. When the paper web retaining member 3 is moved further along the paper web threading path to cause the paper web P to turn around the drag roller 1, the paper web P is divided longitudinally by the action of the sliter 2 into two portions, i.e., two divided paper webs. The free end of the divided paper web P1 which is not retained by the paper web retaining member 3 is pushed forward by the succeeding paper web P so as to move to the position where the paper web retaining member 4 stands by.

After the free end of the divided paper web P1 has overlapped the paper web retaining member 4 which stands by, a paper web threading member S (shown in FIG. 3) is driven by a driver means, not shown, so as to commence forward movement thereof at a speed nearly equal to that of the divided paper web P1, thereby commencing also forward movement of the paper web retaining member 4.

Subsequently, the movable rod of the pneumatic or hydraulic cylinder 15 of the paper web retaining means B is extended so as to lower the holding roller 13. Simultaneously with the lowering of the roller 13, the conveyor 16 is raised by an elevator means, not shown, so that the paper web retaining member 4 and the divided paper web P1 are held between the conveyor 16 and the holding roller 13. The conveyor 16 is diven by a driver means, not shown, so as to rotate in a direction shown by arrows.

The leading end portion of the adhesive tape Q1 is held on the lower peripheral surface of the holding roller 13, with the adhesive surface thereof facing downwards, and when the leading end portion of the adhesive tape is pressed by the downward movement of the holding roller 13, it is stuck over the paper web retaining member 4 and the divided paper web P1.

With further advancement of the paper web retaining member 4 and the divided paper web P1, the adhesive tape Q1 is continuously drawn out and stuck over the paper web retaining member 4 and the divided paper web P1. When the length of the adhesive tape applied over the retaining member 4 and the paper web P1 has reached a sufficient value to secure them, the conveyor 16 is moved down and back to its original position by the action of the elevator means, not shown, thus releasing the pressing action.

Subsequently, the adhesive tape which has been drawn out in the space between the divided paper web P1 and the holding roller 13 is cut by the action of a cutter 17 which has been projected by the extension of the rod of the pneumatic or hydraulic cylinder 18.

After that, as shown in FIGS. 2 and 4, the movable rod of the pneumatic or hydraulic cylinder 18 is retracted so as to return the cutter 17 to its original position, and also the movable rod of the hydraulic cylinder 15 is retracted so as to allow the holding roller 13 to move up and back to its original position. Subsequently, the movable rod of the hydraulic cylinder 14 is retracted so as to move the cover 6 back to its original position, thereby covering up the portion of the retaining means B to be covered up, and assuming a stand-by condition.

The divided paper web P1 is retained onto the paper web retaining member 4 by applying the adhesive tape Q2 (shown in FIG. 4) onto them, thus completing the paper web applying operation. The divided paper web P1 is guided by the paper web retaining member 4 of the paper web threading member and threaded along the predetermined paper web threading path.

It is to be understood that the foregoing description is merely illustrative of a preferred embodiment of the present invention, and that the scope of the present invention is not to be limited thereto, but is to be determined by the scope of the appended claims.

What is claimed is:

1. An apparatus for connecting a paper web with a paper web threading member, which is adapted for use in a paper web handling machine comprising an automatic paper web threading device for threading a paper web along a predetermined paper web threading path from an upstream side thereof towards a downstream side thereof, the apparatus comprising:

a paper web retaining member connected to an upstream end of said paper web threading member and adapted to be located at a predetermined position along said paper web threading path where it is allowed to stand by;

a retaining means for retaining a paper web, which has advanced to the predetermined position along said paper web threading path, onto the paper web retaining member through an intermediary of an adhesive material; and a movable cover means provided in juxtaposition with the retaining means and adapted to be moved so as to selectively cover up or expose at least an adhesive surface of said adhesive material;

said movable cover means comprising a plate member secured to a frame of the paper web handling machine, a fluid cylinder means secured to said plate member and provided with a movable rod, an extension rod connected to a leading end of the movable rod, a cover member supported by the leading end of the extension rod and capable of selectively covering up at least the adhesive surface of said adhesive material, a guide member secured to a front surface of said plate member at a position in the vicinity of the cover member, and a block slidable fitted over said guide member.

2. An apparatus according to claim 1, wherein said movable rod moves to pass through a hole formed in the plate member so as to be projected from the front surface thereof at a right angle thereto.

3. An apparatus according to claim 1, wherein said fluid cylinder means is a hydraulic cylinder.

4. An apparatus according to claim 2, wherein said fluid cylinder means is a pneumatic cylinder.

* * * * *